April 29, 1941.     G. A. TINNERMAN     2,239,797
SPRING FASTENER
Filed Oct. 1, 1936     2 Sheets-Sheet 1

INVENTOR.
GEORGE A. TINNERMAN
BY Bates, Golrick, & Teare
ATTORNEYS

April 29, 1941.  G. A. TINNERMAN  2,239,797
SPRING FASTENER
Filed Oct. 1, 1936   2 Sheets-Sheet 2

INVENTOR.
GEORGE A. TINNERMAN
BY Bates, Gohrick, & Teare
ATTORNEYS

Patented Apr. 29, 1941

2,239,797

UNITED STATES PATENT OFFICE 2,239,797

SPRING FASTENER

George A. Tinnerman, Rocky River, Ohio, assignor, by mesne assignments, to Tinnerman Products, Inc., Cleveland, Ohio, a corporation of Ohio

REISSUED

MAR 10 1942

Application October 1, 1936, Serial No. 103,516

6 Claims. (Cl. 85—36)

This invention relates to spring fasteners, and particularly those which are adapted to be used in conjunction with a bolt for holding two or more articles together.

Spring fasteners of this type have been designed to engage only one helix of a bolt thread for the purpose of effecting an assembly. I have found, however, that a single thread-engaging fastener, especially where the fastener is used to hold heavy parts in connection with automobile assemblies, will strip the bolt threads whenever the bolt is tightened to the desired degree.

An object of the present invention is to make a fastener which may be used satisfactorily for holding heavy parts together without stripping the bolt thread. In this connection the invention is directed toward a construction which may be economically made and readily attached in bolt-receiving position.

Figure 1:
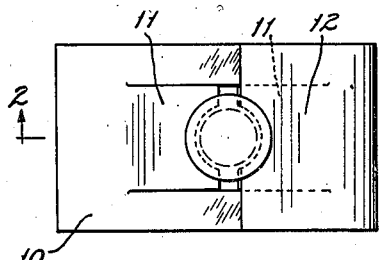
Figure 3:
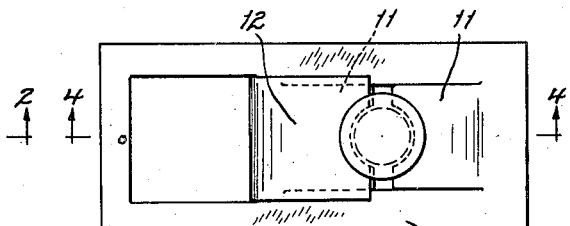
Figure 2:
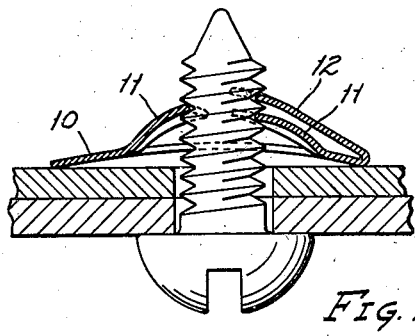
Figure 4:
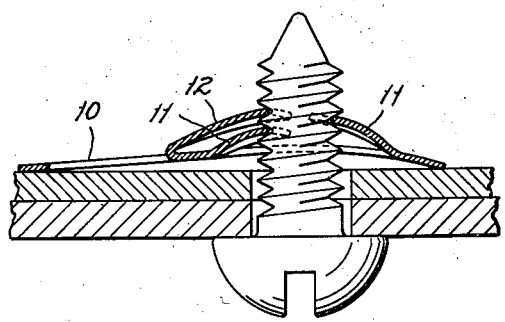
Figure 5:
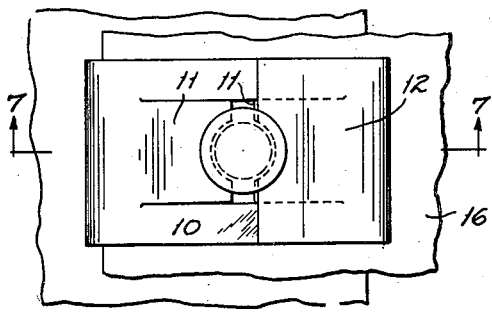
Figure 6:
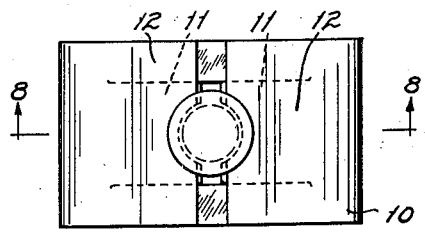
Figure 7:
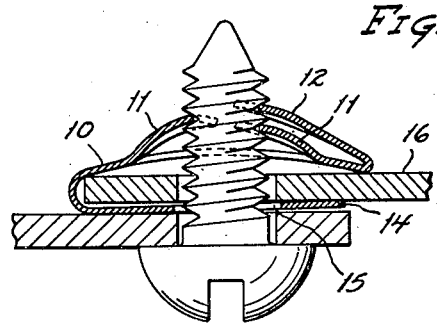
Figure 8:
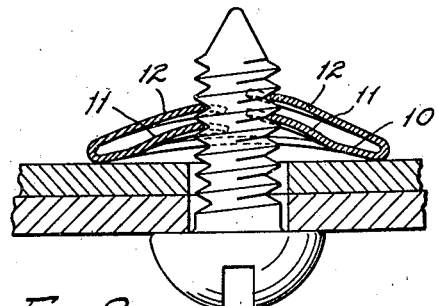
Figure 9:
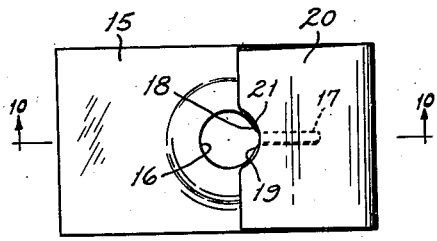
Figure 11:
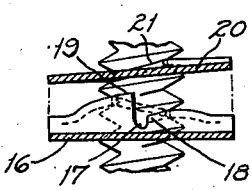
Figure 10:
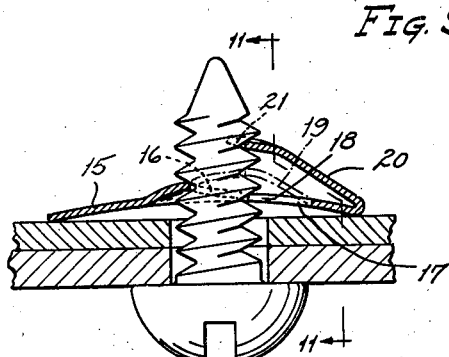
Figure 12:
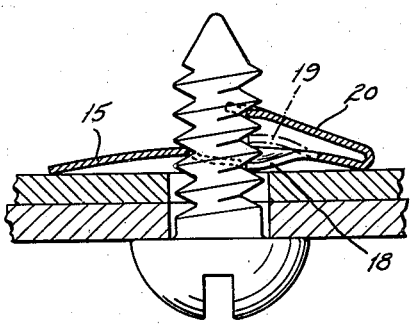
Figure 13:
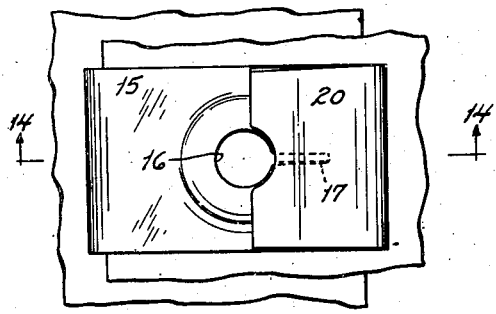
Figure 15:
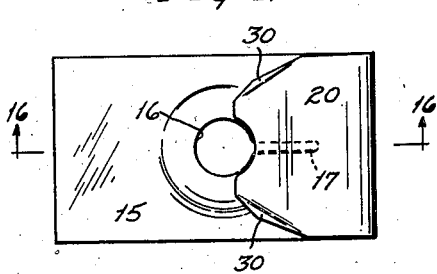
Figure 14:
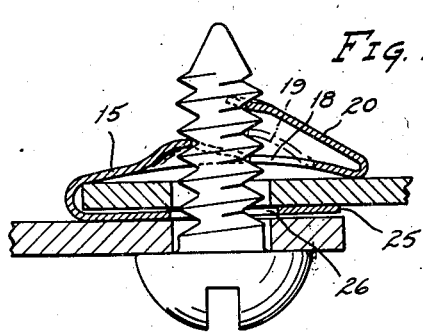
Figure 16:
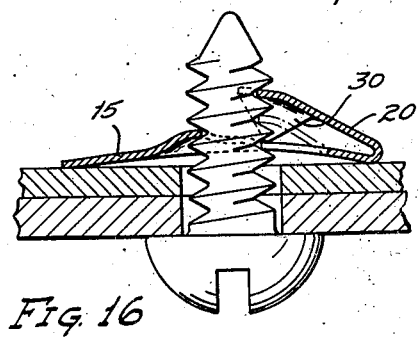

Referring now to the drawings, Fig. 1 is a top plan view of a fastener embodying my invention; Fig. 2 is a section taken on the line 2—2 in Fig. 1; Fig. 3 is a top plan view of a modified form of the invention; Fig. 4 is a section taken on the line 4—4 in Fig. 3; Figs. 5 and 6 are top plan views of other modifications; Figs. 7 and 8 are sections taken on the correspondingly numbered lines on Figs. 5 and 6, respectively; Fig. 9 is a top plan view of a modification of the invention; Fig. 10 is a section taken on the line 10—10 in Fig. 9; Fig. 11 is a section taken on the lines 11—11 in Fig. 10 and Fig. 12 is a vertical section through a fastener showing a modified arrangement of the thread-engaging portion of the fastener; Fig. 13 is a top plan view of another modification of the invention; Fig. 14 is a section taken on the line 14—14 in Fig. 13; Fig. 15 is a top plan view of a fastener of a further modification of the invention and Fig. 16 is a section taken on the line 16—16 in Fig. 15.

Ordinarily, a threadless spring fastener is adapted to engage only one turn of the bolt thread. My invention engages more than one turn and accomplishes such result without threading the fastener. In Fig. 1, for example, the fastener is illustrated as comprising a strip of sheet-metal having a body 10 which may be arched upwardly and which has yieldable bolt thread-engaging portions formed from the body and extending out of the plane thereof. The thread-engaging portions preferably comprise tongues 11, each of which is shown in Fig. 2, as projecting upwardly and as having an aperture which engages a turn of the bolt thread. Additional engagement with the thread is obtained by bending a part of the body upwardly and inwardly, as at 12 and spacing the end of the portion 12 away from the end of the adjacent part 11, so as to engage a different turn of the thread. In the preferred arrangement, the portion 12 is apertured to engage a bolt thread and is disposed above that portion 11 which comprises the point of entrance of the thread into the fastener.

I have found that the shearing of the thread occurs at the point of entrance, and that the utilization of the second thread-engaging part directly above the point of entrance provides sufficient strength to the fastener that the head of the bolt can be twisted off before the thread will be stripped. This arrangement is of major importance in production work, particularly in automotive assembly work.

The modification of Fig. 3 has the same parts and are designated in the same manner as those of Fig. 2, the difference being that the tongue 12 is struck upwardly from a part of the body, whereas in Fig. 1 the tongue 12 is formed by bending the strip upwardly without any punching operation. The fastener of Fig. 4 is advantageous in those installations where a larger bearing surface against the part to be joined is desired.

In Figs. 5 and 7, the modification illustrated has one end of the body portion reversely bent to provide a lower arm 14 which has a bolt-receiving aperture 15 therein. The arm may be spaced from the main portion of the body sufficiently far to admit one of the parts 16 to be joined, but the thread-engaging part of the fastener is the same as that illustrated in Figs. 1 and 2 and so the parts are correspondingly numbered.

The modification of Figs. 6 and 8 is similar to that illustrated in Figs. 1 and 2, except for the fact that each end of the body is bent upwardly and inwardly so as to provide two parts 12 instead of one part.

While I have shown the part 12 in some forms of the invention as being made by bending the end of the body upwardly, I may, if desired, form it by bending up the side of the body. In such case, however, there would be more waste in the manufacture than would be the case where the end is bent upwardly. I prefer, therefore, to use that form which is illustrated.

The modification of Fig. 9 embodies a strip of metal wherein the body portion 15 has a circular bolt-receiving opening 16, and a slot 17 that merges with the circular opening, so as to provide tongues 18 and 19, respectively. The tongue 19 may be struck upwardly out of the plane of the body portion so as to make the marginal edges of the opening 16 conform to the helix of the bolt thread. One end of the body portion is bent upwardly and inwardly to provide an arm 20, which has a recessed portion 21 that is adapted to engage a turn of the bolt thread, which is above that engaged by the tongues 18 and 19. In Fig. 10 the tongue 18 is shown in solid lines as being in the plane of the body portion, whereas the tongue 19 is shown in broken lines as being raised above the plane of the body portion. In Fig. 12, however, the tongue arrangement is modified in that the tongue 18 is struck downwardly from the plane of the body, while the tongue 19 is struck upwardly from the plane of the body.

The modification of Fig. 13 is similar in construction to that illustrated in Figs. 9 and 10, and the corresponding parts bear similar numbers. It differs, however, in that the body portion has the end opposite the arm 20 bent downwardly and thence inwardly, to provide an arm 25, which coacts with the body portion of the strip to provide a clip by means of which the fastener may be securely held in bolt-receiving position. The arm 25 may have a bolt-receiving aperture 26, which is adapted to engage the shank of the bolt and to coact with the bent portion 25 for preventing rotation or dislodgment of the fastener when a bolt is threaded therethrough.

In Fig. 15 I have shown a further modification, wherein the construction is similar to that shown in Fig. 9, except for the fact that the corners of the arm 20 are bent downwardly to provide prongs 30, which are adapted to engage the body of the fastener, and thereby to limit the movement of the arm 20 toward the body portion.

This form of fastener has been developed as a result of a careful analysis as to the cause of the thread stripping, and after repeated experiments to overcome the difficulty. Engagement with the thread at a plurality of points by means of yieldable parts that are formed out of the body, by bending either the body, or a portion of it upwardly and inwardly upon itself, has distributed the stresses uniformly between the thread and the fastener, and has avoided the localization of stresses at the point of entry.

I claim:

1. A sheet metal fastening device, comprising a conical protuberance having an opening in the top thereof, the edge of the wall of which provides a thread, an integral projection overhanging said protuberance and provided with a notch to engage in the groove of the threaded element for the fastening device beyond the groove that receives said edge, and means formed as an integral part of said projection to act as a stop to limit the flattening of said protuberance.

2. A sheet metal structure for receiving a threaded element, comprising a member having a self-locking thread, integral means overhanging the thread and provided with a notch to engage in the groove of the threaded element beyond that receiving the self-locking thread in the member, and stops formed on said means at the sides of said notch for engaging the surface of said member adjacent the self-locking thread whereby the sheet metal structure is strengthened to withstand increased tightening forces.

3. A sheet metal nut comprising a body providing a thread, means overhanging said body and having a notch therein for engaging in the groove of the threaded element for said nut beyond that engaged by said thread, and means formed as an integral part of said first-mentioned means extending toward said body to limit the movement of said means toward said body.

4. A sheet metal nut, comprising a strip of metal consisting of a body and a part projecting out of the plane of said body and having a self-locking thread therein, means to engage a thread of a threaded element beyond the thread engaged by the self-locking thread, and stop means formed on said means for engaging the upper surface of said part adjacent the self-locking thread whereby said nut permits the application of increased tightening forces.

5. A sheet metal nut having a portion providing a thread and an integral projection overhanging said portion having a notch to engage the threaded element for the nut beyond the thread in said portion, an integral body portion on said nut for attaching the nut to a structure engaged thereby, and means integral with said projection engaging said portion adjacent the threaded opening therein for reinforcing the nut whereby increased tightening forces may be applied to said threaded element.

6. A sheet metal nut, comprising a body having a protuberance therein provided with an opening, the edge of said opening being shaped to provide a thread for a bolt, a portion formed integrally with said body and return-bent to overhang said protuberance, an opening in said portion aligned with said first-named opening, and lug means depending from said portion toward said body.

GEORGE A. TINNERMAN.